(12) United States Patent
Bordia et al.

(10) Patent No.: US 11,265,389 B2
(45) Date of Patent: Mar. 1, 2022

(54) SYSTEM AND METHOD FOR COMPUTATION OF USER EXPERIENCE SCORE FOR VIRTUAL APPS AND DESKTOP USERS

(71) Applicant: Citrix Systems, Inc., Fort Lauderdale, FL (US)

(72) Inventors: Akshat Bordia, Bengaluru (IN); Neha Joshi, Bengaluru (IN); Vikramjeet Singh, Bengaluru (IN); Mukesh Garg, Bengaluru (IN); Nikhil Desai Shridhar, Bengaluru (IN); Venkatesh Vellingiri, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 205 days.

(21) Appl. No.: 16/559,236

(22) Filed: Sep. 3, 2019

(65) Prior Publication Data

US 2020/0366747 A1   Nov. 19, 2020

(30) Foreign Application Priority Data

May 17, 2019   (IN) .............................. 201941019659

(51) Int. Cl.
*H04L 29/08* (2006.01)
*H04L 67/50* (2022.01)
(Continued)

(52) U.S. Cl.
CPC ............ *H04L 67/22* (2013.01); *G06F 16/951* (2019.01); *H04L 43/08* (2013.01); *H04L 67/24* (2013.01); *H04L 67/42* (2013.01)

(58) Field of Classification Search
CPC . H04L 65/80; H04L 65/1063; H04L 65/1069; H04L 65/602; H04L 43/08;
(Continued)

(56) References Cited

U.S. PATENT DOCUMENTS

2011/0254961 A1* 10/2011 Putnam .................. H04L 43/10
348/180
2012/0271837 A1   10/2012 Kryger et al.
(Continued)

OTHER PUBLICATIONS

International Search Report and Written Opinion on International Appl. No. PCT/US2020/030238, dated Aug. 10, 2020.
(Continued)

*Primary Examiner* — Etienne P Leroux
(74) *Attorney, Agent, or Firm* — Foley & Lardner LLP

(57) ABSTRACT

Described embodiments provide systems and methods for measuring user experience with virtual or hosted desktops or applications, with scores calculated based on weights determined during a supervisory learning process. The scores are multivariate across a number of factors that affect user experience, enabling administrators to easily and efficiently identify trends and degradations or improvements to a system. This allows the administrator to take mitigating actions, fully implement temporary adjustments, or perform other such functions to improve the working of the system based on the real-time measurement and analysis of user experience.

16 Claims, 11 Drawing Sheets

(51) Int. Cl.
      *G06F 16/951*      (2019.01)
      *H04L 43/08*      (2022.01)
      *H04L 67/54*      (2022.01)
      *H04L 67/01*      (2022.01)

(58) Field of Classification Search
      CPC ............ H04L 43/0817; H04L 43/0852; H04L 41/5067; H04L 41/0803; H04L 41/046; G06F 16/951; G06F 9/451
      See application file for complete search history.

(56) References Cited

U.S. PATENT DOCUMENTS

| | | | |
|---|---|---|---|
| 2018/0174060 A1 | 6/2018 | Velez-Rojas et al. | |
| 2018/0248963 A1* | 8/2018 | Weis | H04L 41/5067 |
| 2019/0034963 A1 | 1/2019 | George et al. | |
| 2020/0334122 A1* | 10/2020 | Shepard | G06F 11/3089 |
| 2020/0336396 A1* | 10/2020 | Su | H04L 41/5009 |

OTHER PUBLICATIONS

International Preliminary Report on Patentability on PCT Appl. No. PCT/US2020/030238 dated Dec. 2, 2021.

\* cited by examiner

SYSTEM AND METHOD FOR COMPUTATION OF USER EXPERIENCE SCORE FOR VIRTUAL APPS AND DESKTOP USERS

RELATED APPLICATIONS

The present application claims the benefit of and priority to Indian Provisional Patent Application No. 201941019659, entitled "System and Method for Computation of User Experience Score for Virtual Apps and Desktop Users," filed May 17, 2019, the entirety of which is incorporated by reference herein.

FIELD OF THE DISCLOSURE

The present application generally relates to communications, including but not limited to systems and methods for network resource monitoring.

BACKGROUND

Conventional end-user experience metrics for users of virtual or hosted desktops or web-based applications are limited to one specific segment of the session life cycle and hence do not provide quantification of holistic user experience. For example, one such metric, logon duration, may reflect how the launch experience has been, independent of other metrics. Similarly round trip time (RTT) may represent the responsiveness or "slugishness" of the in-session experience. In order to determine the overall user experience, administrators have to rely on help desk calls, analyzing trends of various metrics and infrastructure health manually. Along with the manual efforts, this requires substantial expertise with the relevant products, infrastructure, network, and detailed understanding of each of the various metrics.

SUMMARY

This Summary is provided to introduce a selection of concepts in a simplified form that are further described below in the Detailed Description. This Summary is not intended to identify key features or essential features, nor is it intended to limit the scope of the claims included herewith.

To address the problems noted above, an index referred to as a User Experience Score is calculated which represents the holistic end user experience considering various factors and variables in session life cycle which impact the experience while using virtual or hosted desktops or web-based applications. Along with providing a unified index, a factor breakdown is provided which highlights for administrators the areas of improvement that will provide the largest benefit to performance, providing an intuitive and efficient view of performance and guide to adjustments and actionable insights. This quantification of user experience also considers end-user feedback to build a semi-supervised model; according, the score is strongly correlated with the end-user experience.

In one aspect, the present disclosure is directed to a method for enhanced user experience of computing devices. The method includes receiving, by a computing device, values for each of a plurality of experience metrics of a user interacting with a hosted application or desktop provided by the computing device. The method also includes, for each experience metric of the plurality of experience metrics: determining, by the computing device, a score associated with the corresponding value of the experience metric, and determining, by the computing device, a weight associated with the determined score. The method also includes calculating, by the computing device, an aggregated score from the scores and weights for each experience metric of the plurality of experience metrics. The method also includes providing a user experience report comprising the aggregated score, by the computing device, to the user interacting with the hosted application or desktop.

In some implementations, the method includes determining a score associated with the corresponding value of the experience metric by mapping the corresponding value of the experience metric to a score within a predetermined range. In a further implementation, mapping the corresponding value of the experience metric includes applying a first mapping function to the corresponding value, the first mapping function selected from a plurality of mapping functions responsive to the corresponding value being within a bounded range associated with the first mapping function.

In some implementations, the method includes determining a weight associated with the determined score by selecting a weight associated with the corresponding experience metric from a plurality of weights. In a further implementation, the method includes receiving, by the computing device, a user-selected score; and adjusting, by the computing device, at least one weight of the plurality of weights, responsive to a difference between the user-selected score and the calculated aggregated score. In a still further implementation, the method includes calculating a multivariable linear regression based on the user-selected score and the values for each of the plurality of experience metrics. In a yet still further implementation, the method includes receiving, by the computing device, user-selected scores for each of a plurality of user sessions, each user session associated with corresponding values for each of the plurality of experience metrics; and the multivariable linear regression is further based on the user-selected scores and corresponding values for each of the plurality of experience metrics for each of the plurality of user sessions.

In some implementations, the method includes determining a weighted average of the scores for each experience metric of the plurality of experience metrics. In a further implementation, the method includes calculating the aggregated score by dividing a product of a sum of the plurality of weights of the experience metrics, and a sum of a weighted correction factor and the weighted average of the scores for each experience metric of the plurality of experience metrics, by a sum of the plurality of weights of the experience metrics and a weight of the correction factor.

In some implementations, the method includes calculating an estimated aggregated score for an interaction of the user with a second hosted application or desktop; and redirecting the user to the second computing device, responsive to the estimated aggregated score of the interaction with the second computing hosted application or desktop exceeding the calculated aggregated score of the interaction with the computing hosted application or desktop.

In another aspect, the present disclosure is directed to a system for enhanced user experience of computing devices. The system includes a computing device providing a hosted application or desktop for a user, the computing device executing an aggregator. The aggregator is configured to: receive values for each of a plurality of experience metrics of the user interacting with the hosted application or desktop; for each experience metric of the plurality of experience metrics: determine a score associated with the corresponding value of the experience metric, and determine a weight associated with the determined score; calculate an aggregated score from the scores and weights for each experience metric of the plurality of experience metrics; and provide a user experience report comprising the aggregated score to the user.

In some implementations, the aggregator is further configured to map the corresponding value of the experience metric to a score within a predetermined range. In a further implementation, the aggregator is further configured to apply a first mapping function to the corresponding value, the first mapping function selected from a plurality of mapping functions responsive to the corresponding value being within a bounded range associated with the first mapping function.

In some implementations, the aggregator is further configured to select a weight associated with the corresponding experience metric from a plurality of weights. In a further implementation, the aggregator is further configured to: receive a user-selected score; and adjust at least one weight of the plurality of weights, responsive to a difference between the user-selected score and the calculated aggregated score. In a still further implementation, the aggregator is further configured to calculate a multivariable linear regression based on the user-selected score and the values for each of the plurality of experience metrics. In a yet still further implementation, the aggregator is further configured to receive user-selected scores for each of a plurality of user sessions, each user session associated with corresponding values for each of the plurality of experience metrics; and the multivariable linear regression is further based on the user-selected scores and corresponding values for each of the plurality of experience metrics for each of the plurality of user sessions.

In some implementations, the aggregator is further configured to determine a weighted average of the scores for each experience metric of the plurality of experience metrics. In a further implementation, the aggregator is further configured to divide a product of a sum of the plurality of weights of the experience metrics, and a sum of a weighted correction factor and the weighted average of the scores for each experience metric of the plurality of experience metrics, by a sum of the plurality of weights of the experience metrics and a weight of the correction factor.

In some implementations, the aggregator is further configured to: calculate an estimated aggregated score for an interaction of the user with a second hosted application or desktop; and redirect the user to the second hosted application or desktop, responsive to the estimated aggregated score of the interaction with the second hosted application or desktop exceeding the calculated aggregated score of the interaction with the hosted application or desktop.

BRIEF DESCRIPTION OF THE DRAWING FIGURES

The patent or application file contains at least one drawing executed in color. Copies of this patent or patent application publication with color drawings will be provided by the Office upon request and payment of the necessary fee.

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for computation of user experience score for virtual apps and desktop users.

A. Network and Computing Environment

Figure 1A:
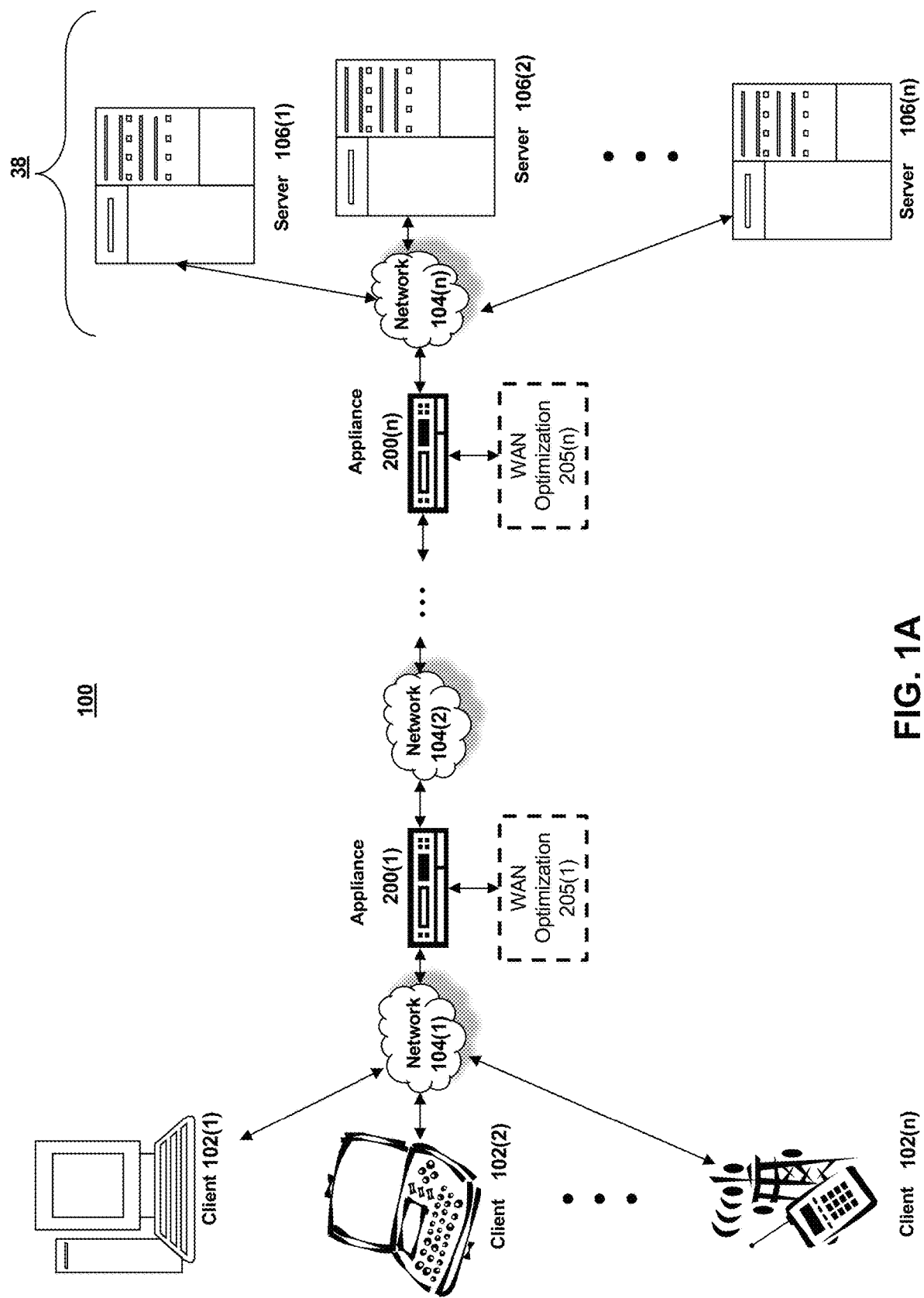
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
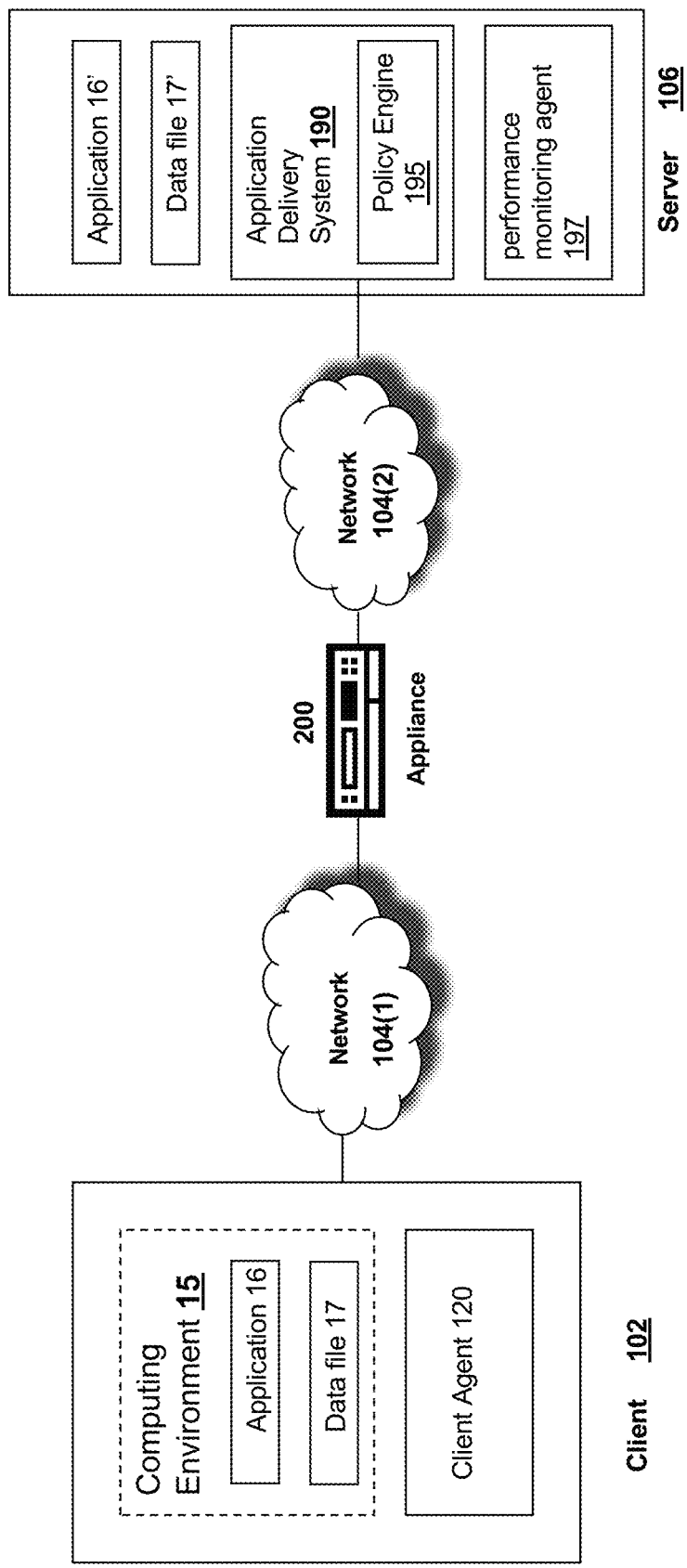
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
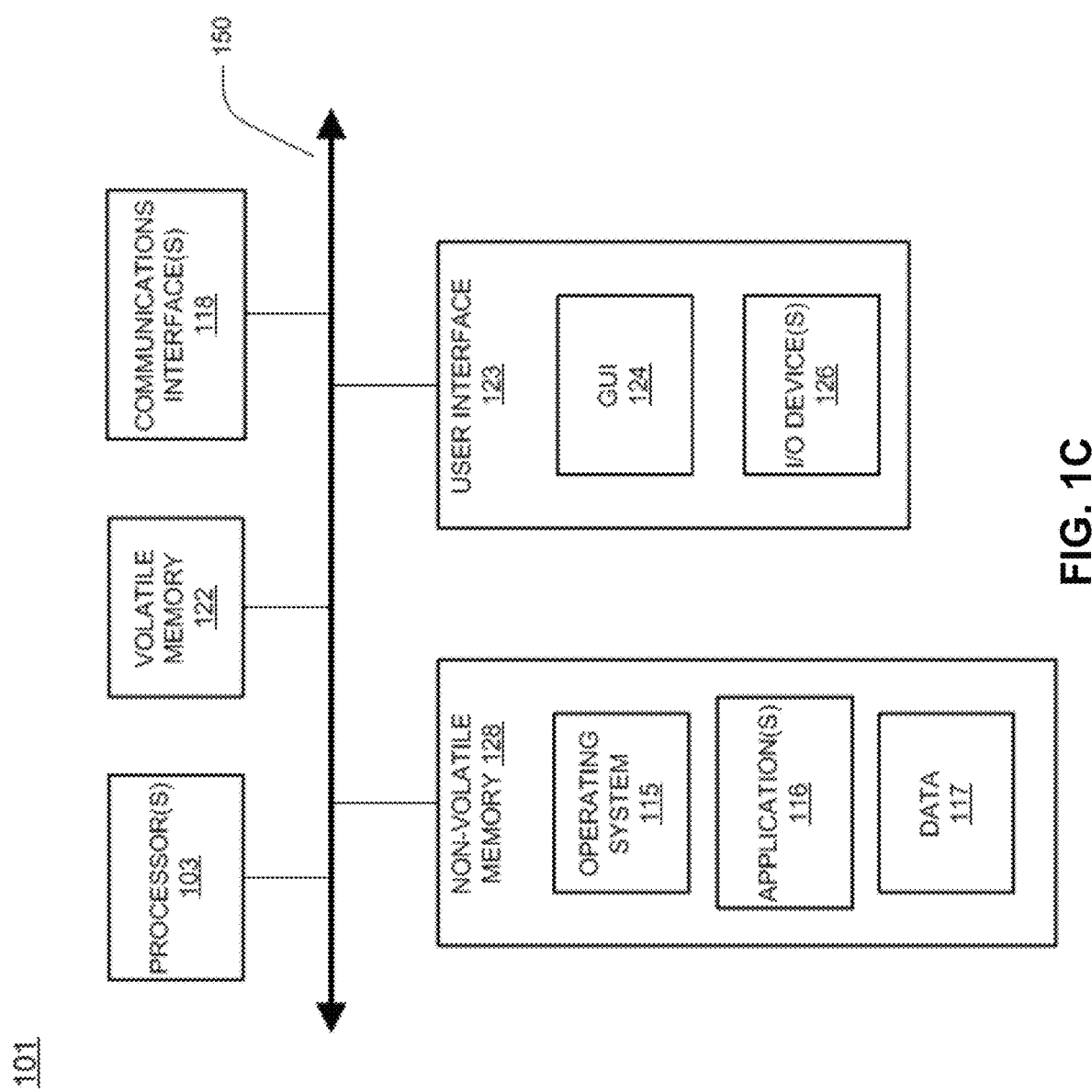
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
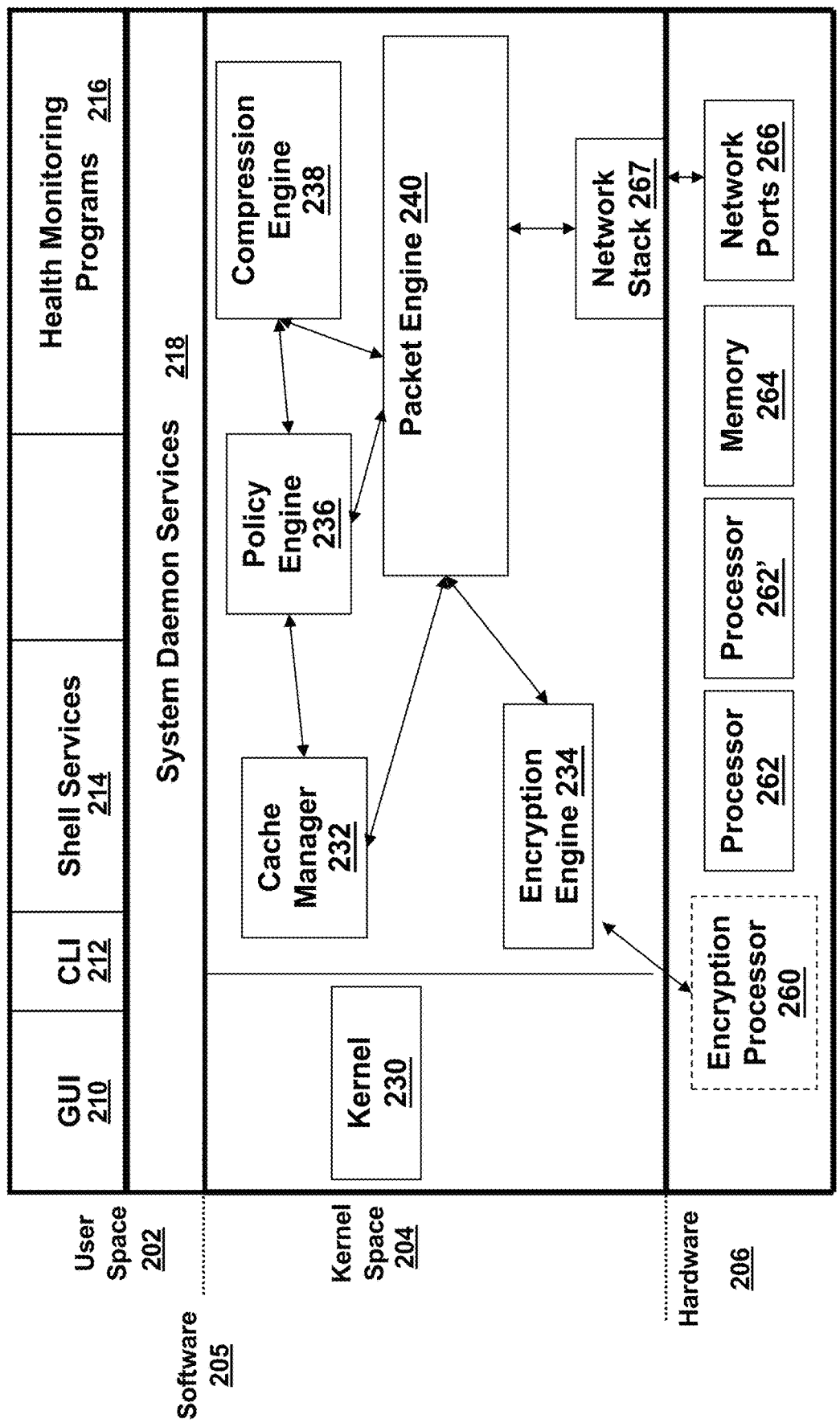
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104.

Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
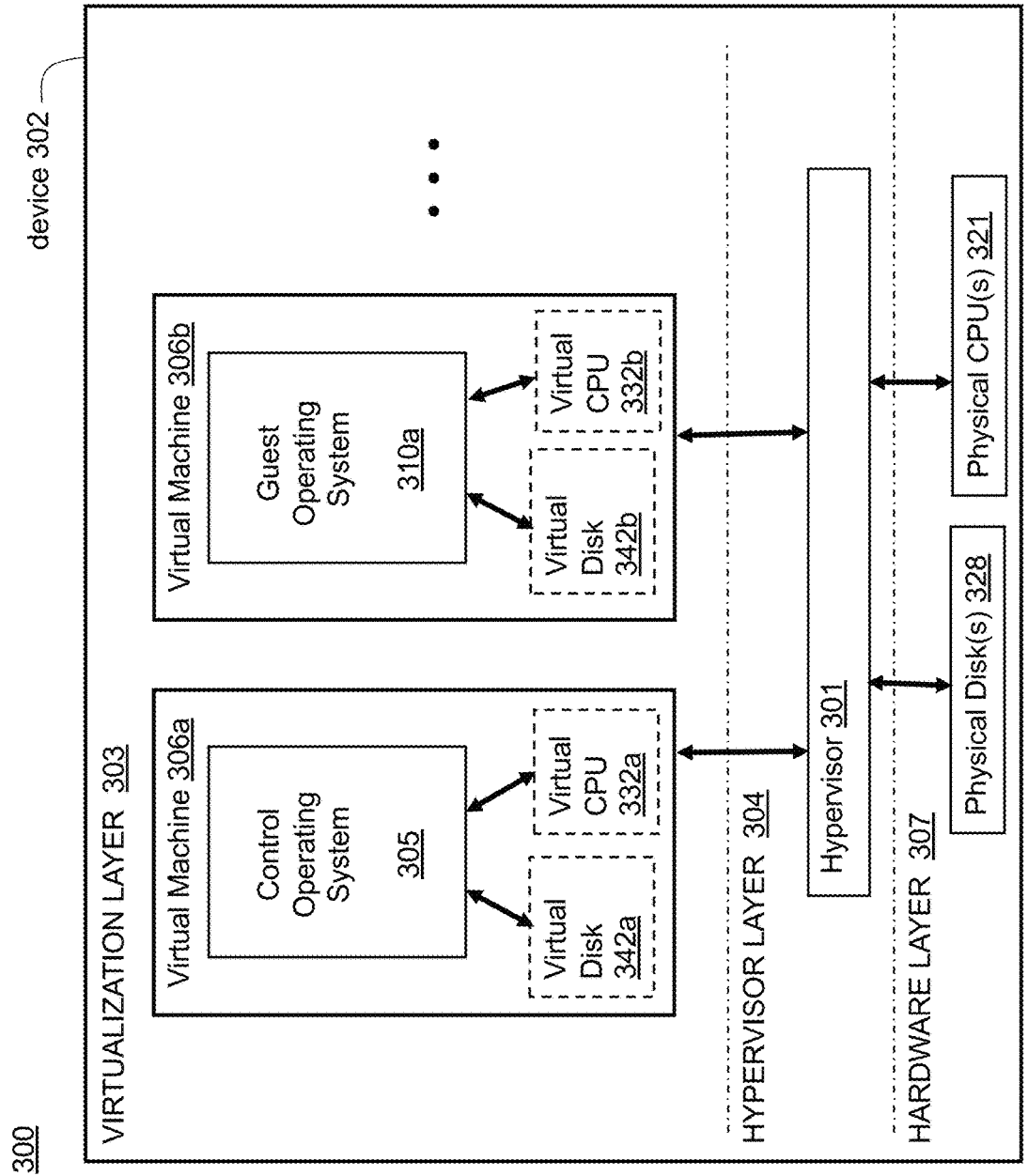
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
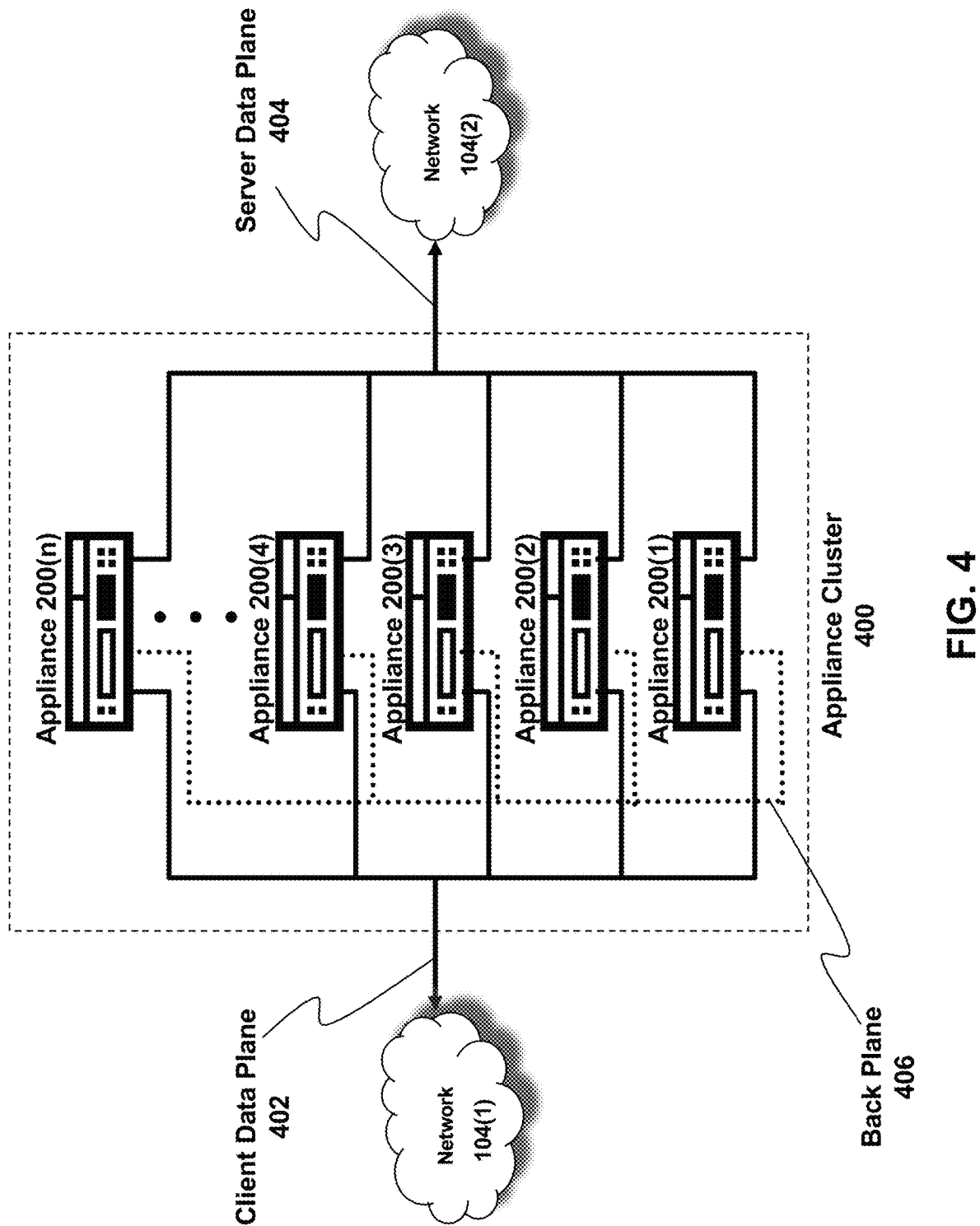
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Computation of User Experience Score for Virtual Apps and Desktop Users Systems and methods not implementing the improvements described herein have difficulty in determining and displaying holistic end-user experience metrics for users of virtual or hosted desktops or web-based applications. Such implementations are typically limited to one specific segment of the session life cycle and hence do not provide quantification of the overall user experience. For example, metrics such as logon duration or round trip time (RTT), may allow single-variable analysis of responsiveness or how well a connection is maintained, but may falsely obscure problems, such as a highly responsive session that experiences frequent dropped connections; or a stable, but slow system. In order to determine the overall user experience, administrators have to rely on help desk calls, analyzing trends of various metrics and infrastructure health manually. Multi-variate analysis of these metrics is very difficult in such implementations, if not impossible, particularly as the number of metrics and sessions grows, and due to the large number of variables and their processor/device/network-specific nature, cannot readily be accomplished by an individual.

To address the problems noted above, an index referred to as a User Experience Score is calculated which represents the holistic end user experience considering various factors and variables in session life cycle which impact the experience while using virtual or hosted desktops or web-based applications. Along with providing a unified index, a factor breakdown is provided which highlights for administrators the areas of improvement that will provide the largest benefit to performance, providing an intuitive and efficient view of performance and guide to adjustments and actionable insights. This quantification of user experience also considers end-user feedback to build a semi-supervised model; according, the score is strongly correlated with the end-user experience Various metrics may be used with the systems and methods discussed herein, which may be grouped conceptually, for example as shown in the table below:

| Category | Metric Name | Description |
| --- | --- | --- |
| Launch Experience | Logon Duration | Logon duration is one of the very first metrics in the Session Life cycle. It is the time period from the instant when a user clicks on a resource (application and desktop) in a virtual or hosted desktop or web application until the instant when the app or desktop is available for use. This includes time taken in various processes in the complex launch sequence. Total logon time is impacted by events such as Brokering, VM Start, HDX Connection, Authentication, Profile Load, Logon Script, GPO, and Shell Launch etc. Correlation with User Experience: User experience degrades as the logon duration increases. Units: Seconds Impacting Factors: Group Policy Objects, Logon Scripts, Profile Size, VDA Load, DDC Load, Storefront Load, Client Network |
| Launch Experience | Reconnection Duration | In case of session roaming, manual disconnect and re-launch, not all the processes re-occur in the launch sequence. For example, the user profile isn't loaded again. However overall reconnection duration is important to determine the user experience. Correlation with User Experience: User experience degrades as the reconnection duration increases. Units: Seconds |
| In-Session Experience | Session RTT | Session Round Trip Time refers to the elapsed time from when the user hits a key until the graphical response is displayed back, which is a factor of both network round trip time and processing delay. This represents the screen refresh lag which an end user experiences. Correlation with User Experience: User experience degrades as the Session RTT value increases. Units: Milliseconds |
| In-Session Experience | Session Latency | Indicates the time a data packet takes to get from the client-side network interface to the server-side network interface and back, exclusive of processing delay. Correlation with User Experience: User experience degrades as the Session Latency value increases. Units: Milliseconds |
| In-Session Experience | Rate of Reconnection | Due to any fluctuation in the client's network, a user's screen may freeze (e.g. during a gateway protocol reconnection) or the connection may get disconnected and subsequently reconnected when network connectivity is restored (e.g. during automatic client rerouting) Correlation with User Experience: A higher number of reconnections indicates degradation in user experience. An ACR reconnect is more disruptive in comparison to a gateway protocol reconnect. Units: Ratio (# of Reconnects/Duration) |
| Launch Success | % Failure | Any failure to launch sessions would disrupt the user productivity. Hence, % Failures is an important factor in quantifying the user experience. In some implementations, % Failure is equal to = 100*[number of failures/(number of failures plus number of successful launches)] Correlation with User Experience: High % of failure indicates degraded user experience. Units: Percentage |

In many implementations, additional metrics or combinations of these or other metrics may be utilized.

End-User Feedback in Workspace App

In order to build a semi-supervised model for calculating User Experience Score, new feedback data points are introduced which will be captured in virtual or hosted desktop client applications and/or other client applications such as web browsers to correlate with the end-user experience. At the time of each session end, feedback questions may be asked to end-users in some implementations:

a) How was the overall experience using the application/desktop, scored over a defined range (e.g. 1-100)?

b) Which of the following impacted your experience most negatively?
   a. Took too long to launch application/desktop.
   b. Heavy lag while accessing application/desktop.
   c. Too many reconnection/screen freeze.
Other questions may be utilized in various implementations.

This data may be used in labelling session data and building a semi-supervised model for calculating a User Experience Score, as described below. With a potentially very large number of end users or clients for a web application or virtual or remote desktop workspace, large amounts of data may be collected easily and efficiently, which may serve as large training data set, thus leading to a strong semi-supervised model.

Formulation of the User Experience Score

The following section describes the formulation of the User Experience Score in a "bottom up" approach. Individual components contributing to the score are discussed first and then the User Experience Score formulation is presented utilizing those definitions. In implementations, these calculations may be done in any suitable order, and may involve intermediate calculations. For example, in some implementations, a user can have multiple sessions and hence, a first one or more sessions (referring to one or more individual sessions, rather than initial sessions, necessarily) be considered for calculation of an intermediate Session Experience Score, prior to quantifying an overall User Experience Score.

1. Factor Score

In order to quantify the User Experience, one or more of the above-mentioned factors or metrics may be utilized, as well as other metrics such as CPU utilization, memory usage, network bandwidth, etc. As described above, various factors have different units. Hence, in many implementations, it may be useful to produce a mapping such that the individual factor values are mapped into a predetermined range (e.g. 1-100, with 1 being the worst and 100 being the best experience in context of the particular factor). The mapped score may be referred to as a Factor Score, and may be calculated for each user session for a defined time granularity (e.g. hourly, semi-hourly, daily, weekly, monthly, etc.). In many implementations, the mapping function may have one or more of the following properties:

1. The output of mapping should be in a predetermined range (e.g. 1-100).
2. The mapping should be correlated with user experience (e.g. the output should increase towards a maximum value as the factor indicates better user experience and should decrease towards a minimum value as the user experience degrades).
3. The mapping should be continuous and should return an output value for each input factor metric value.

In some implementations, the following steps may be performed to determine a factor score:

A. Benchmarking/Threshold Calculation:

In order to benchmark the user experience with respect to a particular factor, thresholds categorizing the factor/metrics into 3 categories (e.g. Excellent, Fair and Poor) are determined using statistical techniques. This benchmarking may be done at a customer, departmental, group, or other organizational level since different user groups may have various configurations, different ranges of accepted behavior, etc. In some implementations, an Interquartile Range (IQR) may be employed for this purpose as follows. Quartiles divide the ordered metrics data set into four equal parts. Q1, Q2, Q3 may refer to threshold values, such as the middle values in the first half of metric values, median metric value, and middle value in the second half of metric values respectively. The IQR is equal to Q3–Q1. IQR may be used to benchmark metrics data and calculate thresholds for each of the above-mentioned categories. The IQR multiplication-factor determining a first threshold T2 is chosen in such a way that an optimal percentage of metrics are classified as Poor, such that an administrator looking to improve the health of the system has an achievable number to work with. The multiplication factor $M_f$ may be any appropriate value, such as 2.5.

Two thresholds may be determined according to the formula below:

$$T1=Q3$$

$$T2=Q3+M_f*IQR$$

Metrics are classified into the three categories based on the thresholds:

$$\text{value} \leq T1 \rightarrow \text{Excellent}$$

$$\text{value} > T1 \,\&\&\, \text{value} \leq T2 \rightarrow \text{Fair}$$

$$\text{value} > T2 \rightarrow \text{Poor}$$

This benchmarking and thresholding calculation above may be utilized with metrics in which the user experience degrades as the factor metrics values increase (e.g. as for each of the factors discussed above). It may be similarly calculated for other metrics in which the user experience gets better if the value increases, reversing the threshold values or mapping to categories.

B. Factor Score Calculation

Figure 5A:
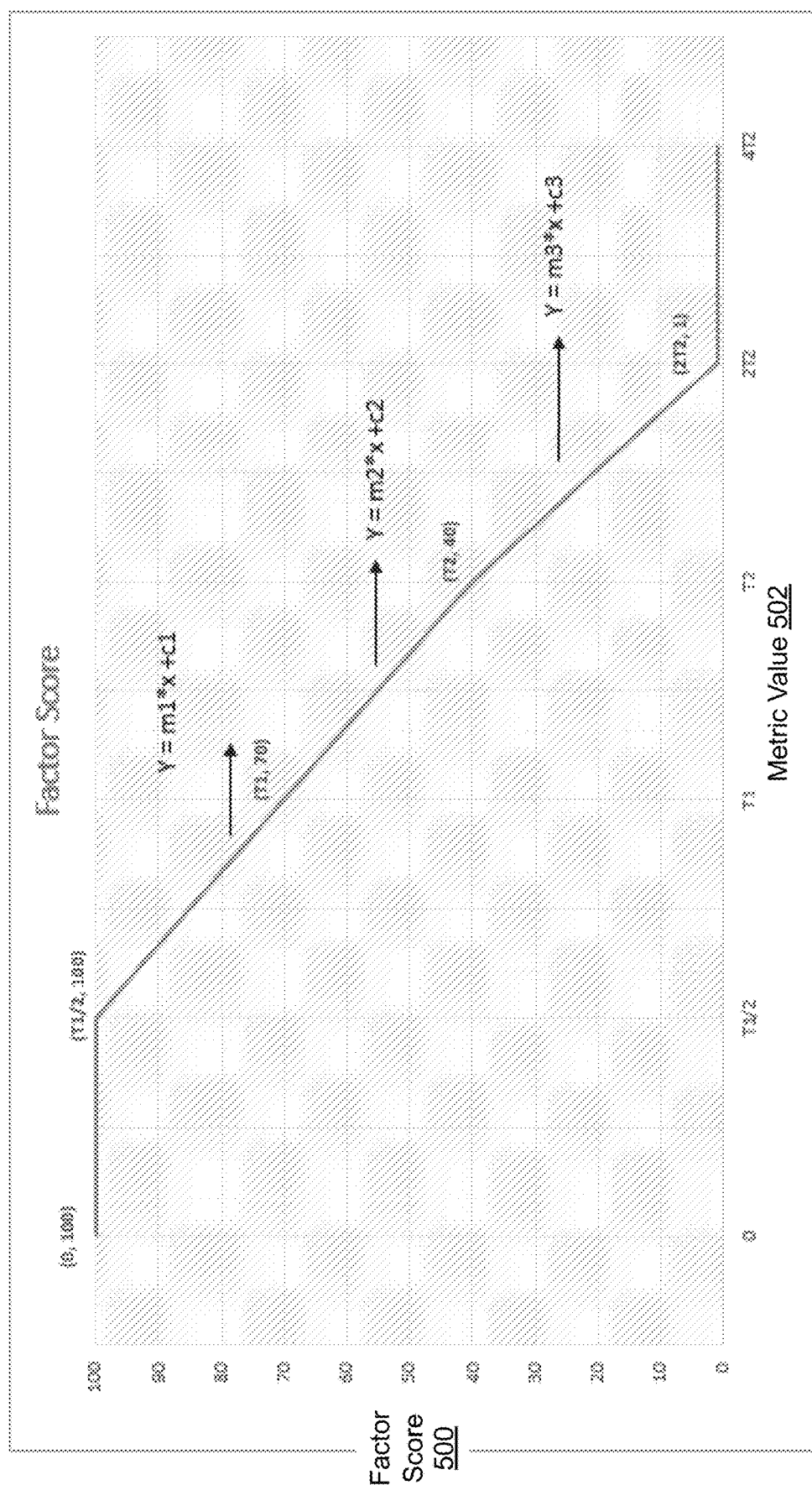
FIG. 5A is a graph illustrating an example mapping of performance metrics to scores, according to some implementations.

As a result of the benchmarking and thresholding discussed above, two thresholds may be calculated: T1 and T2. Based on these values, factor metrics values may be mapped to factor scores within the predetermined range (e.g. 1-100) according to the criterion noted above. This mapping may be done according to a piecewise linear function as depicted in the equations below and demonstrated in the example graph of FIG. 5A, illustrating mapping of metric values 502 to factor scores 500:

$$\text{factor score}=100 \text{ for: } 0 \leq \text{metric value} < T1/2$$

$$\text{factor score}=m1*x+c1 \text{ for: } T1/2 < \text{metric value} < T1$$

$$\text{factor score}=m2*x+c2 \text{ for: } T1 < \text{metric value} < T2$$

$$\text{factor score}=m3*x+c3 \text{ for: } T2 < \text{metric value} < 2T2$$

$$\text{factor score}=1 \text{ for: } 2T2 \leq \text{metric value}$$

In the example illustrated, a score of 100 (best) is mapped to any metric value below T1/2 and a score of 1 (worst) is mapped to anything above 2T2 since they are outliers. As demonstrated in the example of FIG. 5A, for each linear segment, there are starting and ending coordinates (Metric Value, Score), where the Metric Value coordinate is calculated from thresholds. In the normalized 1-100 range illustrated, 70-100 is categorized as excellent, 40-70 as fair and below 40 as poor. Based on these starting and ending coordinates, line parameters (slope m, constant c) can be obtained. Accordingly, from the above equations, for any given value of metric value x, the corresponding factor score y may be calculated.

In other implementations, other functions such as exponential, quadratic, or geometric functions may be utilized for the mapping. In some implementations, multiple function types can be combined, such as a first linear segment from T1/2 to T1, followed by an exponential function from T1 to T2.

Factor Weights

Individual factor scores are calculated as explained above. However, the severity by which a certain factor impacts user experience may be different than others. For example, dropping connections may be more frustrating than latency, or failure to launch a session or application may be more frustrating than a longer launch duration. Hence, in many implementations, scores may be weighted according to factor weights. These weights are discussed in more detail below.

Session Experience Score

Users may have multiple sessions, either serially or concurrently, and accordingly, there may be a 1:N mapping between a particular user and their sessions. Hence, an intermediate Session Experience Score is introduced. The intermediate session score may be calculated as a weighted average of various factor scores for a particular duration, formulated as below:

$$\text{Session Experience Score} = \frac{\Sigma_{f_i \in F} w_i * \text{factor } score_i}{\Sigma w_i}$$

$f_i$ represents an individual factor impacting session experience and F is a set containing all such factors. $W_i$ and factor $score_i$ are a weight and factor score of $f_i$, respectively. % Failures may not be included in the set F, since it's not applicable at a session level, but at the user level. The Session Experience Score obtained from above formula may be within the predetermined range used for mapping as discussed above (e.g. 1-100).

Weight Determination

Various approaches may be employed to determine weights used in calculation of the session experience scores and for correction factors.

In a first implementation, weights may be based on domain knowledge. For example, the following table indicates an order of relative importance for individual factors mentioned above, descending in importance from high to low, according to some implementations:

| Factor ($f_i$) | Weight ($w_i$) |
|---|---|
| % Failures | 1 |
| Rate of reconnection | 0.75 |
| Session RTT | 0.5 |
| Session Latency | 0.4 |
| Logon duration | 0.25 |
| Reconnection Duration | 0.15 |

In other implementations, other weights or order of factors may be utilized.

In a second implementation, weights may be determined based on a supervised model using multivariable linear regression. As discussed above in connection with the Session Experience Score equation, Session Experience Score may be a linear weighted combination of various factor scores. Utilizing a user feedback approach as discussed above, the system may receive end user data on each session experience. This data may be used in training a model for weight estimation. The equation has multiple independent input variables (e.g., factor score) and one output variable (e.g., session experience score), which are linearly correlated. In order to estimate the weights, a multivariable linear regression approach may be employed.

The multivariable linear regression can be represented as below:

$$\hat{y} = a_0 + a_1 X_1 + a_2 X_2 + \ldots + a_n X_n$$

where $\hat{y}$ is the predicted value and $X_n$ are the independent variables, and $a_n$ are the estimated weights using linear regression. In various implementations, techniques such as Linear Least Square or Maximum likelihood estimation may be employed to estimate weights.

Correction Index

As mentioned above, certain factors are applicable at a user level and not at a particular session level. Hence, their contribution to the user experience score may be introduced as a correction index. Correction index may be defined as a factor score for the factor that contributes to the correction (e.g., % Failure Score). The correction factor may be in a predetermined range (e.g. 1-100):

$$\text{Correction Index} = \text{factor } score_c$$

In case of addition of a new correction factor, a correction index formulation can be updated to a weighted summation of correction factor scores.

User Experience Score

In order to calculate a User Experience Score over a particular duration, an average of session experience scores may be calculated. This average session experience score is combined with the correction factor to arrive at the User Experience Score. However, in order to normalize the score, the average of session experience score is multiplied by a summation of weights of factors impacting the session experience score. The Correction Factor is multiplied by a correction factor weight. This value is divided by a summation of weights of session factors and the correction factor, which results in a normalized score (e.g. in range 1-100). In some implementations, User Experience Score (sometimes referred to as "UXS") may be calculated as follows:

$$UXS = \frac{(\Sigma_{i \in session factors} w_i) * \frac{\Sigma_j \text{session experience } score_j}{\text{Number of sessions}} + w_c * \text{Correction Factor}}{\Sigma_{i \in session factors} w_i + w_c}$$

Thus, using the above formula, User Experience Score is calculated for each user. To provide a snapshot view of the environment to administrators, the users are classified into 3 categories based on User Experience Score (e.g. Excellent (70-100), Fair (40-70), Poor (1-40), etc.). These categories may be customized or adjusted by administrators or users of the system.

Figure 5B:
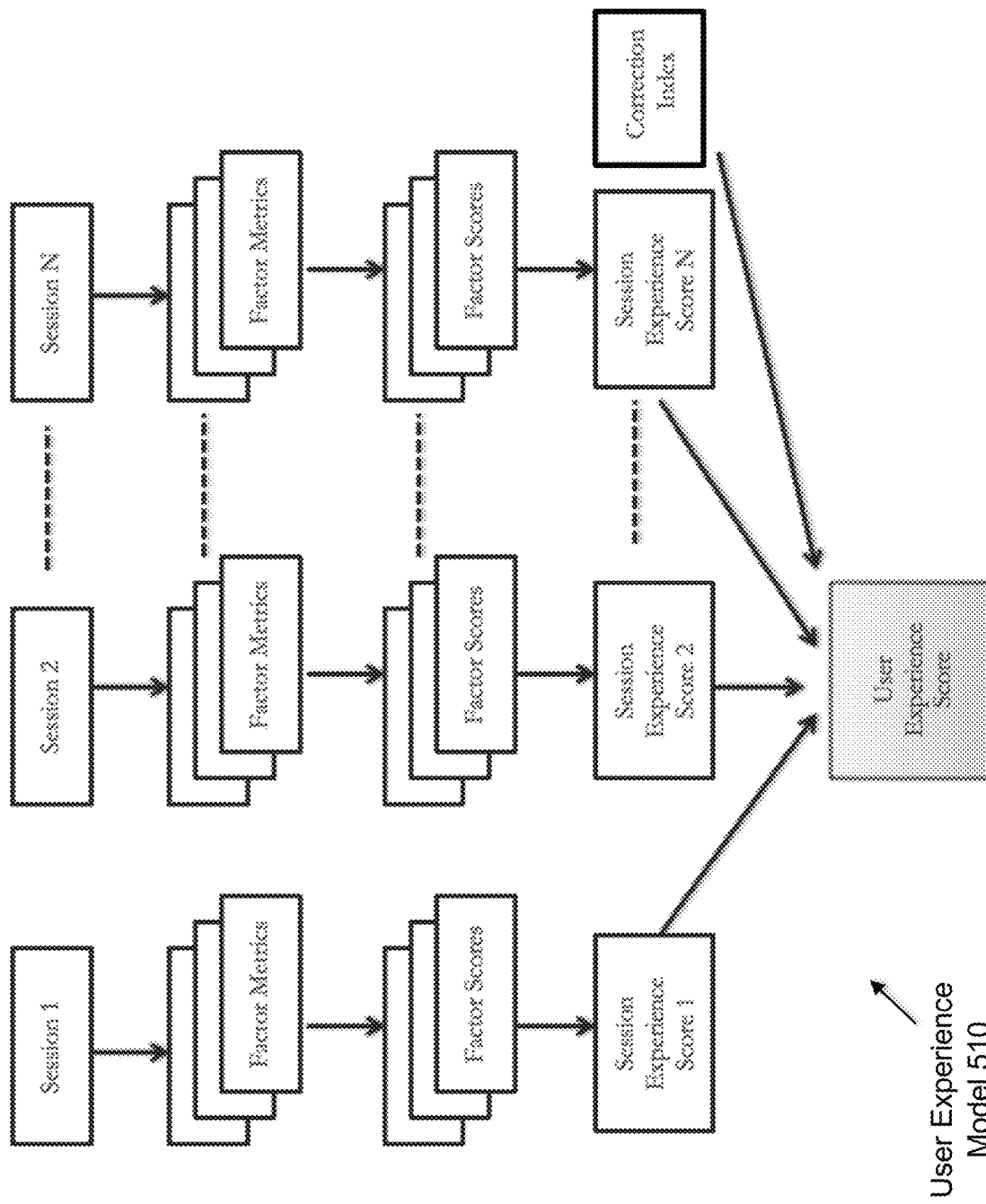
FIG. 5B is a block diagram of a method for determination of a user experience score from a plurality of metrics, according to some implementations.

FIG. 5B illustrates this process of determining a user experience score graphically, according to some implementations. The block diagram illustrates an implementation of a user experience model 510, which may be based on a plurality of sessions 1-N. One or more factor metrics may be measured for each session, and mapped to corresponding factor scores. For each session, an intermediate session experience score 1-N is calculated, along with a correction index. The user experience score is then calculated based on these intermediate session experience scores and correction index. Advantageously, intermediate session scores may be filtered and/or weighted (e.g. reducing the effect of older sessions, as various changes are made to the network environment).

Figure 5C:
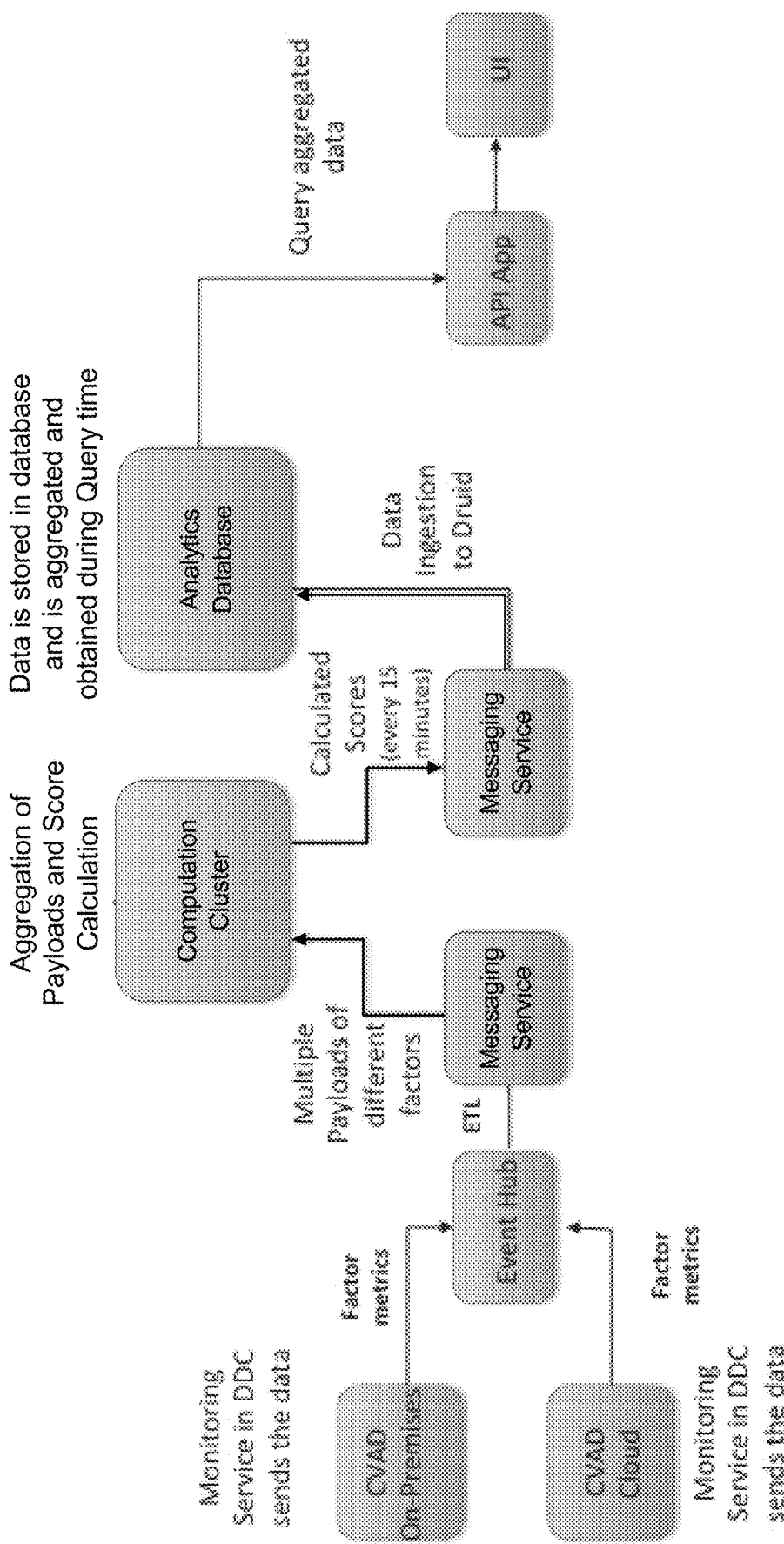
FIG. 5C is a block diagram of a system for determination of a user experience score from a plurality of metrics, according to some implementations.

FIG. 5C is a block diagram of a system for determination of a user experience score from a plurality of metrics, according to some implementations. Virtual applications and desktops (referred to as CVADs) may be monitored by a CVAD Monitoring Service, which collects the various factor metrics and provides the metrics to an event hub. The monitoring service may be executed on a client device, within a virtual or hosted desktop environment, on a monitoring server, or elsewhere (e.g. network devices). As discussed above, different factors may include Logon Durations, session RTTs, Failure rates, Reconnections, etc.

The event hub receives each factor metric and may pass them to a messaging service after performing extract, transform, load (ETL) operations on the data (e.g. filtering, normalizing, etc.). The messaging service may aggregate and buffer different metrics for processing by an aggregator.

The computation cluster, sometimes referred to as an aggregator, transformer, or by other such terms, may consume data cumulated over a period (e.g. 15 minutes) and may calculate a User Experience Score and/or Session Experience Score as discussed above, and may return the result to the messaging service. The messaging service may provide the score data to a real-time analytics database for storage, aggregation, and subsequent querying and analysis. Queries may be performed over the time series data to obtain aggregated User Experience Scores for higher granularity.

Figure 5D:
FIG. 5D is a screenshot of an example of a user interface for displaying a user experience score calculated from a plurality of metrics, according to some implementations.

FIG. 5D is a screenshot of an example of a user interface for displaying a user experience score calculated from a plurality of metrics, according to some implementations. As shown, a user experience score may be calculated and displayed by a user interface for one or more users, groups of users, or other such entities. User experiences may be categorized (e.g. excellent, fair, and poor), and total numbers, relative scores, trends, and weights of various factors or aggregated or averaged factor scores for individual factors may be displayed. The user interface may be intuitive and efficient, allowing administrators to quickly identify problems and/or identify trends in user experience as a system degrades or improvements are made.

Figure 5E:
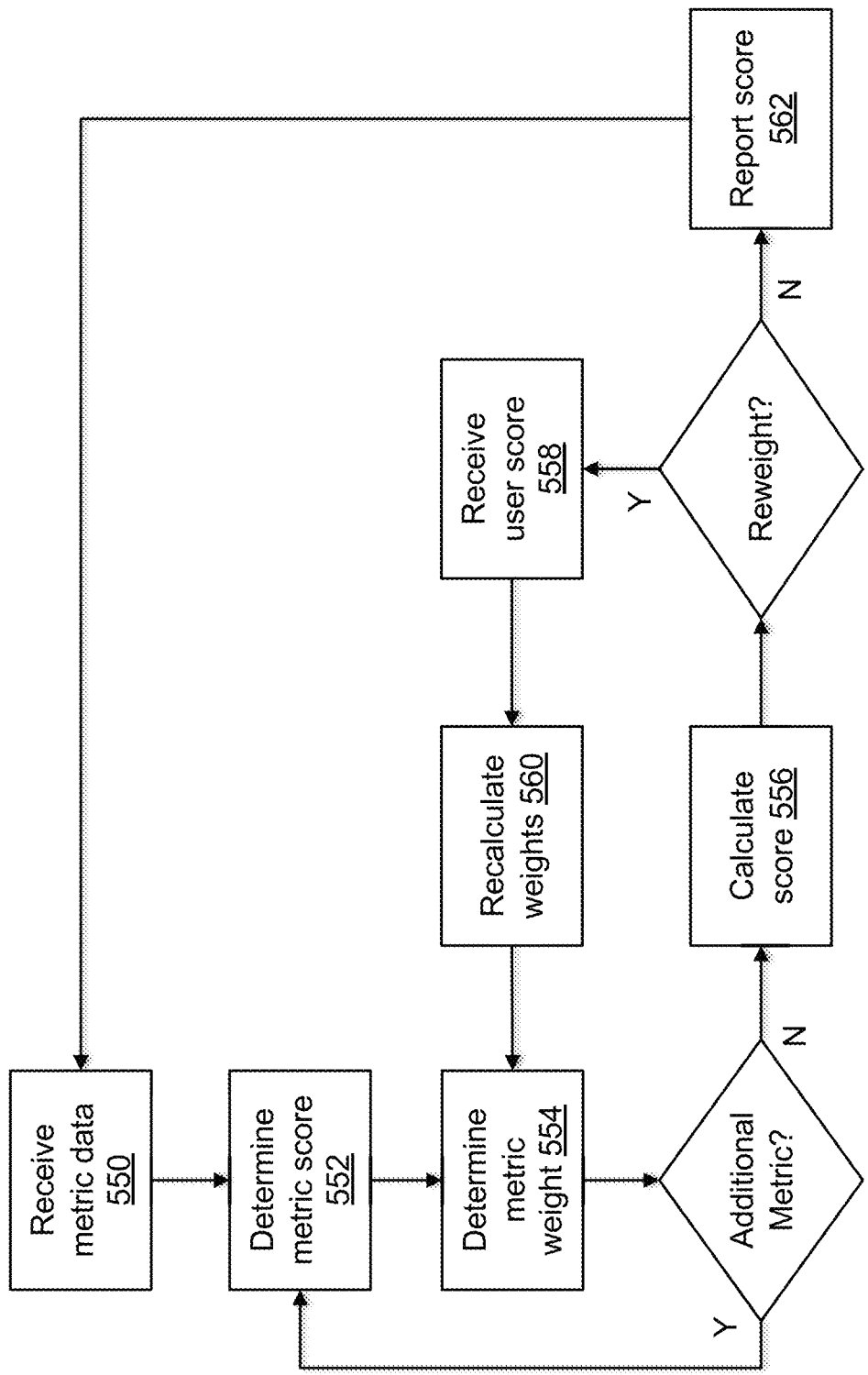
FIG. 5E is a flow chart of a method for determination of a user experience score from a plurality of metrics, according to some implementations.

FIG. 5E is a flow chart of a method for determination of a user experience score from a plurality of metrics, according to some implementations. At step 550, metric data may be received by a computing device, such as a server, monitoring device, or other such device. At step 552, a metric score may be determined, mapping the metric data within a predetermined range. At step 554, a weight for the metric may be determined. Steps 552-554 may be repeated for each additional metric.

At step 556, a score may be calculated, for a session and/or aggregated from a plurality of sessions, as discussed above. In a training process, a user score for the session or plurality of sessions may be received at step 558, and the user score compared to the calculated score. Based on the comparison, metric weights used for the score calculation may be adjusted or recalculated at step 560. Steps 554-556 may be repeated, or in some implementations, the system may continue with step 562. At step 562, the session score or aggregated total score may be reported to an administrator and/or recorded in a database for subsequent retrieval, querying, or analysis, as discussed above.

Accordingly, the systems and methods discussed herein provide a dynamic and self-adjusting monitor of user experience with virtual or hosted desktops or applications, with scores calculated based on weights determined during a supervisory learning process. The scores are multivariate across a number of factors that affect user experience, enabling administrators to easily and efficiently identify trends and degradations or improvements to a system. This allows the administrator to take mitigating actions, fully implement temporary adjustments, or perform other such functions to improve the working of the system based on the real-time measurement and analysis of user experience.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed:

1. A method for enhanced user experience of computing devices, comprising:
   receiving, by a computing device, values for each of a plurality of experience metrics of a user interacting with a hosted application or desktop provided by the computing device;
   for each experience metric of the plurality of experience metrics:
      determining, by the computing device, a score associated with the corresponding value of the experience metric, and
      determining, by the computing device, a weight associated with the determined score, the weight selected from a plurality of a weights based on an association with the corresponding experience metric;
   calculating, by the computing device, an aggregated score from the scores and weights for each experience metric of the plurality of experience metrics;
   providing a user experience report comprising the aggregated score, by the computing device, to the user interacting with the hosted application or desktop;
   receiving, by the computing device, a user-selected score; and
   adjusting, by the computing device, at least one weight of the plurality of weights, responsive to a difference between the user-selected score and the calculated aggregated score.

2. The method of claim 1, wherein determining a score associated with the corresponding value of the experience metric further comprises mapping the corresponding value of the experience metric to a score within a predetermined range.

3. The method of claim 2, wherein mapping the corresponding value of the experience metric further comprises applying a first mapping function to the corresponding value, the first mapping function selected from a plurality of mapping functions responsive to the corresponding value being within a bounded range associated with the first mapping function.

4. The method of claim 1, wherein adjusting the at least one weight of the plurality of weights further comprises calculating a multivariable linear regression based on the user-selected score and the values for each of the plurality of experience metrics.

5. The method of claim 4, wherein adjusting the at least one weight of the plurality of weights further comprises receiving, by the computing device, user-selected scores for each of a plurality of user sessions, each user session associated with corresponding values for each of the plurality of experience metrics; and wherein the multivariable linear regression is further based on the user-selected scores and corresponding values for each of the plurality of experience metrics for each of the plurality of user sessions.

6. The method of claim 1, wherein calculating the aggregated score further comprises determining a weighted average of the scores for each experience metric of the plurality of experience metrics.

7. A method for enhanced user experience of computing devices, comprising:
receiving, by a computing device, values for each of a plurality of experience metrics of a user interacting with a hosted application or desktop provided by the computing device;
for each experience metric of the plurality of experience metrics:
determining, by the computing device, a score associated with the corresponding value of the experience metric, and
determining, by the computing device, a weight associated with the determined score;
calculating, by the computing device, an aggregated score from the scores and weights for each experience metric of the plurality of experience metrics by dividing a summation of a product of a sum of the plurality of weights of the experience metrics with the weighted average of the scores for each experience metric of the plurality of metrics for a plurality of user sessions and a sum of a product of a weight of a correction factor and a correction factor score, by a sum of the plurality of weights of the experience metrics and the weight of the correction factor; and
providing a user experience report comprising the aggregated score, by the computing device, to the user interacting with the hosted application or desktop.

8. A method for enhanced user experience of computing devices, comprising:
receiving, by a computing device, values for each of a plurality of experience metrics of a user interacting with a hosted application or desktop provided by the computing device;
for each experience metric of the plurality of experience metrics:
determining, by the computing device, a score associated with the corresponding value of the experience metric, and
determining, by the computing device, a weight associated with the determined score;
calculating, by the computing device, an aggregated score from the scores and weights for each experience metric of the plurality of experience metrics;
calculating an estimated aggregated score for an interaction of the user with a second hosted application or desktop; and
redirecting the user to the second hosted application or desktop, responsive to the estimated aggregated score of the interaction with the second computing hosted application or desktop exceeding the calculated aggregated score of the interaction with the computing hosted application or desktop.

9. A system for enhanced user experience of computing devices, comprising:
a computing device providing a hosted application or desktop for a user, the computing device executing a computation cluster configured to:
receive values for each of a plurality of experience metrics of the user interacting with the hosted application or desktop;
for each experience metric of the plurality of experience metrics:
determine a score associated with the corresponding value of the experience metric, and
determine a weight associated with the determined score, the weight selected from a plurality of a weights based on an association with the corresponding experience metric;
calculate an aggregated score from the scores and weights for each experience metric of the plurality of experience metrics;
provide a user experience report comprising the aggregated score to the user;
receive a user-selected score; and
adjust at least one weight of the plurality of weights responsive to a difference between the user-selected score and the calculated aggregated score.

10. The system of claim 9, wherein the computation cluster is further configured to map the corresponding value of the experience metric to a score within a predetermined range.

11. The system of claim 10, wherein the computation cluster is further configured to apply a first mapping function to the corresponding value, the first mapping function selected from a plurality of mapping functions responsive to the corresponding value being within a bounded range associated with the first mapping function.

12. The system of claim 9, wherein the computation cluster is further configured to calculate a multivariable linear regression based on the user-selected score and the values for each of the plurality of experience metrics.

13. The system of claim 12, wherein the computation cluster is further configured to receive user-selected scores for each of a plurality of user sessions, each user session associated with corresponding values for each of the plurality of experience metrics; and wherein the multivariable linear regression is further based on the user-selected scores and corresponding values for each of the plurality of experience metrics for each of the plurality of user sessions.

14. The system of claim 9, wherein the computation cluster is further configured to determine a weighted average of the scores for each experience metric of the plurality of experience metrics.

15. A system for enhanced user experience of computing devices, comprising:
a computing device providing a hosted application or desktop for a user, the computing device executing a computation cluster configured to:
receive values for each of a plurality of experience metrics of the user interacting with the hosted application or desktop;
for each experience metric of the plurality of experience metrics:
determine a score associated with the corresponding value of the experience metric, and
determine a weight associated with the determined score;
calculate an aggregated score from the scores and weights for each experience metric of the plurality of experience metrics by dividing a summation of a product of a sum of the plurality of weights of the experience metrics with the weighted average of the scores for each experience metric of the plurality of metrics for a plurality of user sessions and a sum of a product of a weight of a correction factor and a correction factor score, by a sum of the plurality of weights of the experience metrics and the weight of the correction factor; and provide a user experience report comprising the aggregated score to the user.

16. A system for enhanced user experience of computing devices, comprising:
a computing device providing a hosted application or desktop for a user, the computing device executing a computation cluster configured to:
receive values for each of a plurality of experience metrics of the user interacting with the hosted application or desktop;
for each experience metric of the plurality of experience metrics:
determine a score associated with the corresponding value of the experience metric, and
determine a weight associated with the determined score;
calculate an aggregated score from the scores and weights for each experience metric of the plurality of experience metrics;
calculate an estimated aggregated score for an interaction of the user with a second hosted application or desktop; and
redirect the user to the second hosted application or desktop, responsive to the estimated aggregated score of the interaction with the second hosted application or desktop exceeding the calculated aggregated score of the interaction with the hosted application or desktop.

* * * * *